United States Patent [19]

Vaught

[11] Patent Number: 4,981,109

[45] Date of Patent: Jan. 1, 1991

[54] BABY CHICKS FEEDER TRAY

[76] Inventor: James Vaught, Rte. #2, Box 238, Elkins, Ark. 72727

[21] Appl. No.: 482,857

[22] Filed: Feb. 22, 1990

[51] Int. Cl.$^5$ ............................................. A01K 39/00
[52] U.S. Cl. ......................................................... 119/61
[58] Field of Search ....................................... 119/61, 1

[56] References Cited

U.S. PATENT DOCUMENTS

| | | | |
|---|---|---|---|
| 2,336,306 | 12/1943 | Shoemaker et al. | 119/61 |
| 3,154,052 | 10/1964 | Sweeney | 119/1 |
| 3,664,304 | 5/1972 | Carter | 119/61 |
| 4,164,314 | 8/1979 | Edgar | 119/1 |
| 4,487,163 | 12/1984 | Jobert et al. | 119/1 |
| 4,553,671 | 11/1985 | Cheesman | 119/1 |
| 4,706,606 | 11/1987 | Coppola | 119/1 |
| 4,724,953 | 2/1988 | Martin et al. | 119/1 |
| 4,739,725 | 4/1988 | Fennelly | 119/1 |
| 4,800,841 | 1/1989 | Yananton et al. | 119/1 |

Primary Examiner—Paul J. Hirsch
Attorney, Agent, or Firm—Shlesinger & Myers

[57] ABSTRACT

A feeder tray for baby chicks comprises a peck-disintegratable bio-degradable fiber receptacle. The receptacle is adapted to be completely disintegratable into tiny particles by the end of the brooding period from the pecking of the chicks so that the tiny particles will substantially decompose on site, thereby eliminating the necessity to remove and dispose of a feeder tray after the chicks have outgrown the need for a feeder tray.

3 Claims, 2 Drawing Sheets

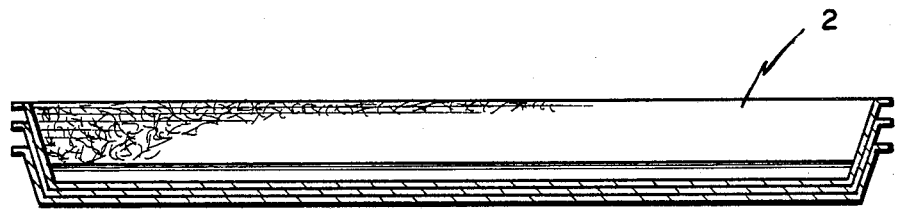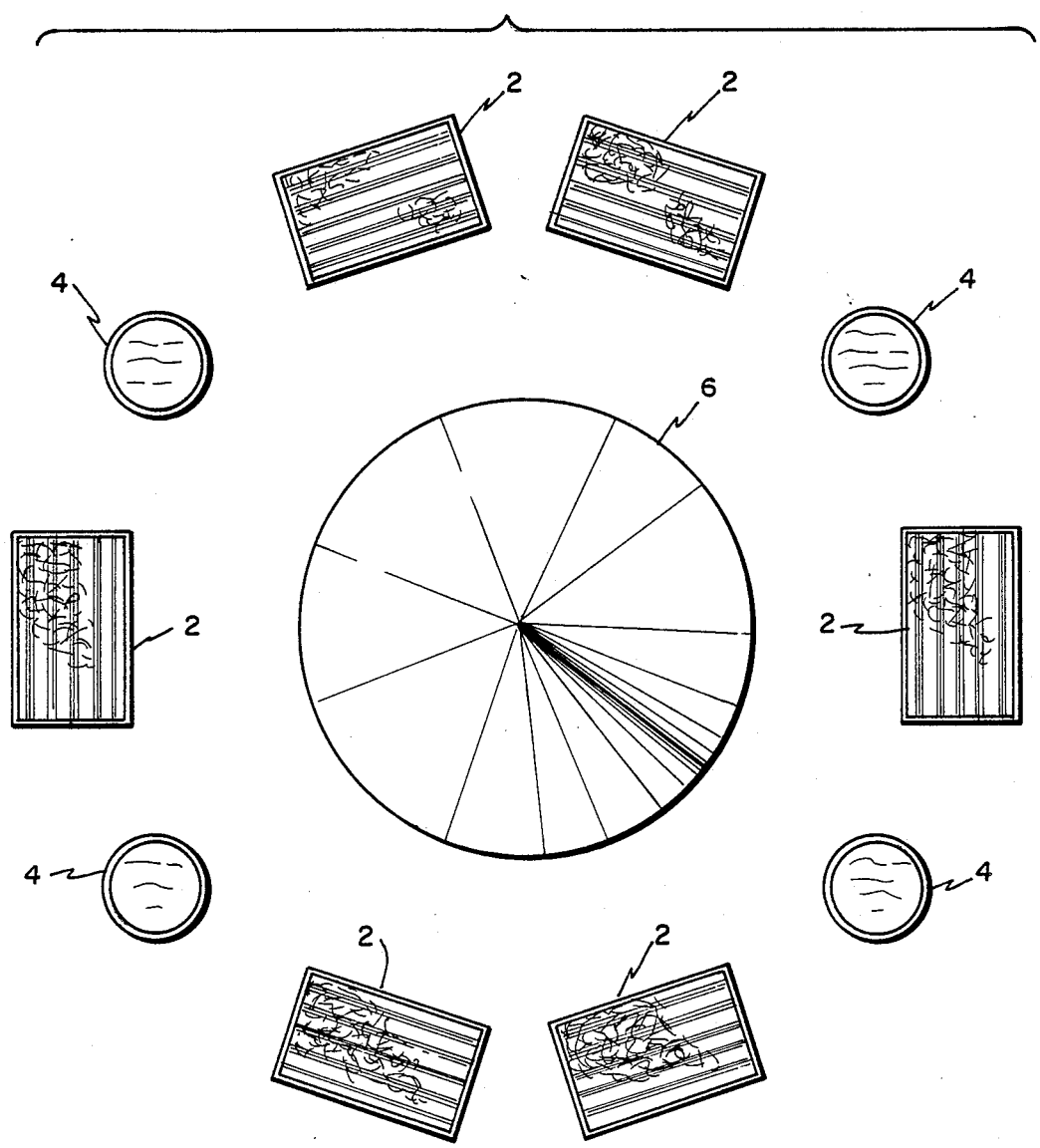

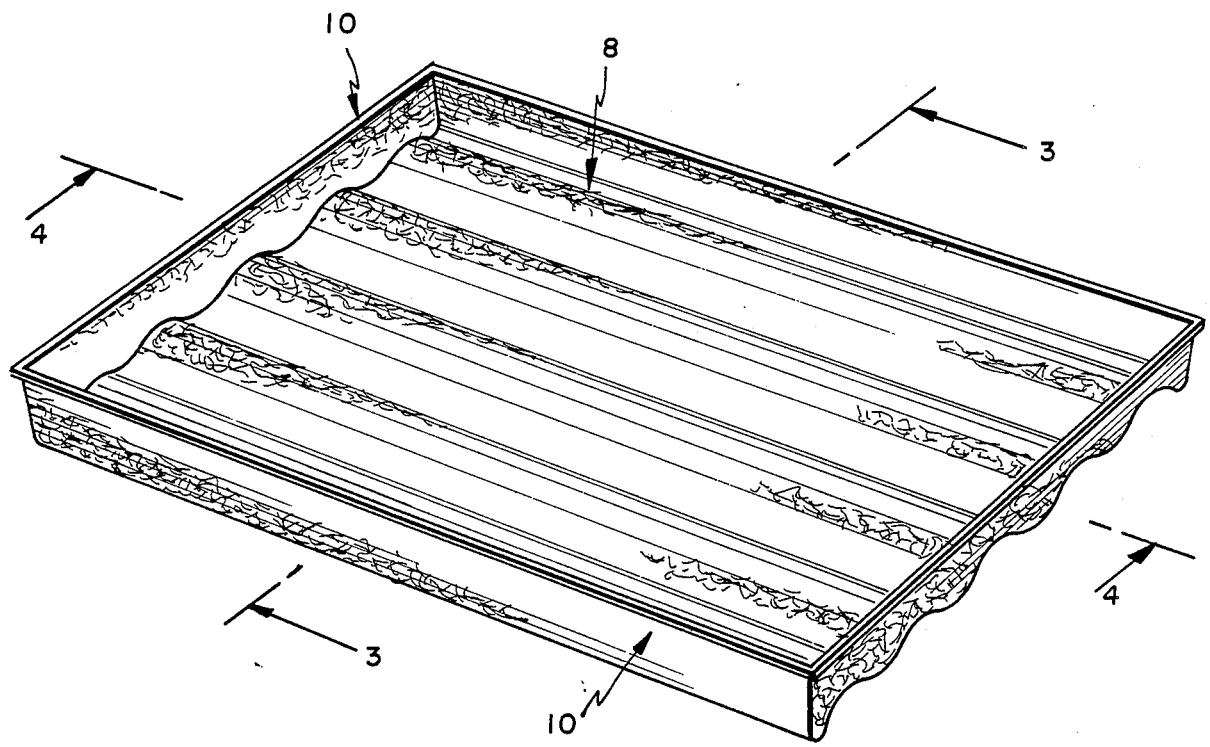
FIG_2
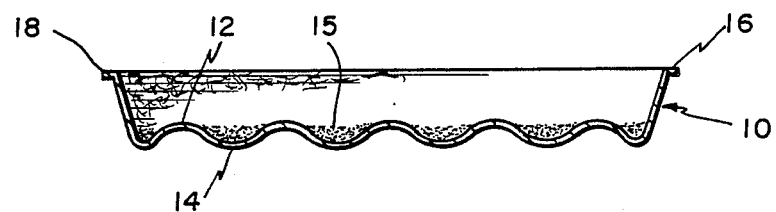
FIG_3
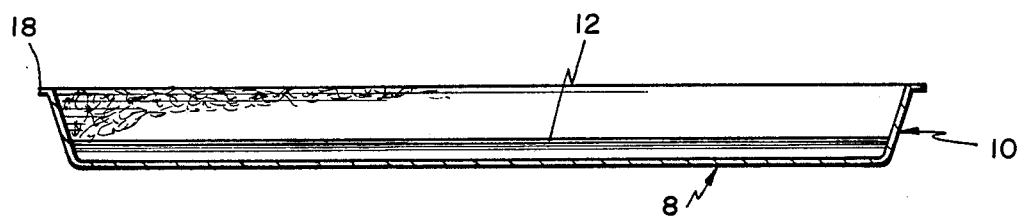
FIG_4

BABY CHICKS FEEDER TRAY

FIELD OF THE INVENTION

The present invention relates generally to a chicken feeder tray, and in particular to a feeder tray for baby chicks that disintegrates on site into tiny particles by the end of the brooding period of the baby chicks.

BACKGROUND OF THE INVENTION

The vast majority of chicken houses are equipped with automated feeders that supply food to the chicken during approximately four to eight week period in which they inhabit the house. However, from the time a chicken is hatched until it is approximately ten days old, they are too small to feed from the automatic feeders.

The method of feeding baby chicks has remained the same since the beginning of large scale chicken production. A baby chick arriving at the poultry farm is only a few hours old, only three to four inches tall and weights only a few ounces. To feed these baby chicks, the chicken grower places feeder trays throughout the chicken house that are then filled with feed. These feeder trays have short sides and are placed close to the brooder area (heating stove) so that the baby chicks, with the limited mobility and inability to reach the taller sides of the automatic feeders, can find feed as soon as possible. The baby chicks use these feeder trays for approximately ten days after which time they move to the automatic feeders.

Presently, there exist two types of feeder trays that are used to feed baby chicks. One type is a plastic feeder tray that is about 22"×16" with 2" sides. The second type is a cardboard feeder tray that is about 20"×17" with 2" sides. Both feeder trays are placed in the chicken house as described. However, once the baby chicks have abandoned the plastic trays for the automatic feeder, the plastic trays must be taken out of the chicken house, washed and sanitized. Removing, cleaning and sanitizing these plastic trays take many labor hours and substantial amounts of water. The mixture of feed, moisture and chick feces bond together like glue to the trays. If the plastic trays are not properly cleaned, the dirty trays will grow mold that is very harmful to the chicks intestine.

The cardboard trays are placed in the chicken houses in the same manner as the plastic trays. But, the cardboard trays are sold to the growers unassembled. The sides of these trays must be folded up and locked into place. Folding hundreds of these trays each growing period is a costly and labor intensive process. Further, once the cardboard trays are assembled, the sides are parallel, preventing them from stacking. This makes handling these trays difficult. And further, when the chicks outgrow the cardboard feeder trays, they must be taken out of the house and disposed of. Most chicken growers burn the used cardboard trays, a practice that is dangerous and sometimes prohibited during dry weather.

OBJECTS AND SUMMARY OF THE INVENTION

It is therefore an object of the present invention to provide a feeder tray for baby chicks that will disintegrate into tiny particles in the chicken house by the end of the brooding period of the baby chicks, thereby saving labor, time and water involved in retrieving, washing and sanitizing plastic trays.

It is another object of the present invention to provide a feeder tray for baby chicks that will prevent the risk of spreading disease through use of old infected trays.

It is still another object of the present invention to provide a feeder tray for baby chicks that will save the labor and time of assembling and later removing cardboard trays from the chicken houses.

It is yet another object of the present invention to provide a feeder tray for baby chicks that will avoid the risk associated with the common practice of burning used cardboard trays.

It is still further another object of the present invention to provide a feeder tray for baby chicks that is made from molded peck-disintegratable bio-degradable fiber that is non-toxic to the baby chicks even if ingested.

It is an object of the present invention to provide a feeder tray for baby chicks that is preformed so that it does not require assembly, thereby saving labor and time.

It is another object of the present invention to provide a feeder tray for baby chicks that is stackable to ease placement in the chicken house.

It is still another object of the present invention to provide a feeder tray for baby chicks that is light weight and easy to handle.

It is yet another object of the present invention to provide a feeder tray for baby chicks that is relatively inexpensive, thereby making it feasible to use new sanitary trays for each new lot of baby chicks.

It is another object of the present invention to provide a feeder tray for baby chicks that conserves feed.

It is yet another object of the present invention to provide a feeder tray for baby chicks that piles the feed into heaps to make the feed accessible to the baby chicks.

It is still another object of the present invention to provide a feeder tray for baby chicks that is made from peck-disintegratable bio-degradable materials that disintegrate into tiny particles from the pecking action of the baby chicks, thereby hastening the on-site decomposition process.

In summary, the present invention provides a feeder tray for baby chicks that will disintegrate by the end of the brooding period of the baby chicks, thereby saving the grower labor, time and water in clean up.

These and other objects of the present will become apparent from the following detailed description.

BRIEF DESCRIPTIONS OF THE DRAWINGS

FIG. 1 is a plan view of a portion of a chicken house where baby chicks are grown, showing in use a number of feeder trays according the present invention.

FIG. 2 is a perspective view of a feeder tray according to the present invention.

FIG. 3 is a cross-sectional view of the feeder tray taken along line 3—3 in FIG. 2, showing feed disposed therein.

FIG. 4 is a cross-sectional view of the feeder tray taken along line 4—4 in FIG. 2.

FIG. 5 is a cross-sectional view of three feeder trays according to the present invention in a stacked position.

DETAILED DESCRIPTION OF THE INVENTION

FIG. 1 discloses a typical arrangement of a brooder area within a chicken house for growing baby chicks, using a plurality of feeder trays 2 made according to the present invention. The feeder trays 2 and a number of water trays 4 are arranged around a heating stove 6. The warmth of the heating stove 4 draws the baby chicks to the feeder trays 2.

Each feeder tray 2 is a preformed molded fiber receptacle having a bottom wall 8 and integral side walls 10, as best shown in FIG. 2. Although the tray 2 is shown as rectangular in plan view, it may be of any size and shape.

The trays 2 are made from materials having the same consistency as egg carton pulp. Other materials may be used such as rice hull pulp, sawdust pulp, paper pulp, straw pulp or any other non-harmful, non-toxic materials, peckdisintegratable, bio-degradable materials. The type and thickness of the materials used allows the trays 2 to be disintegrated into tiny particles from the pecking action of the baby chicks, thereby hastening the on-site decomposition process. Rice hulls may be advantageous since most chicken houses are already bedded with rice hulls and they are abundant and cheap. The trays 2 may be dyed with the color red to help attract the baby chicks.

The bottom wall 8 of each tray 2 has alternating and interconnected ridge and trough portions 12 and 14, respectively, providing a corrugated appearance, as best shown in FIG. 3. The ridge portions 12 and trough portions 14 preferably run parallel to each other along a longitudinal axis of the tray 2. The ridge and trough portions 12 and 14, respectively, are wave-like in cross-section with substantially constant frequency and amplitude, as best shown in FIG. 3, thereby positioning each trough portion 14 at the same distance to an adjacent ridge portion 12. The trough portions 14 lie substantially on a horizontal plane to provide a stable base for the tray 2.

The construction of the bottom wall 2 adds strength to the tray 2. In addition, the trough portions 14 help conserve the feed 15 from the scratching actions of the baby chicks by trapping the feed in the trough portions 14. Further, the trough portions 14 provides the means for heaping the feed 15, thereby making the feed accessible to the baby chicks, as best shown in FIG. 3. A person skilled in the art will understand that baby chicks cannot eat the feed unless it is in a pile. The trough portions 14 also provide a relatively large surface area from which the baby chicks can obtain the feed 15.

The alternating ridge portions 12 and trough portions 14 are preferably curved as opposed to being angular advantageously to prevent the feed 15 from being stuck in the apex of the trough portions 14 and for providing a relatively large surface area on the ridge portions 12 for the baby chicks to stand on, as best shown in FIG. 3.

The side walls 10 are slanted outwardly so that the trays 2 will stack together, as best shown in FIG. 5.

The ridge portions 12 are disposed below an upper edge 16 of the side wall 10. The tray 2 includes a lip 18 disposed along the upper edge 16 advantageously to provide strength and rigidity to the opening of the tray 2.

The tray 2 preferably has uniform thickness throughout to help in the disintegration and the resulting decomposition process. For example, for a tray 2 made from material having the consistency of egg carton pulp, the tray 2 with thickness of 1/16" was found to have substantially disintegrated by the end of four weeks. A range of 1/32" to 3/32" thickness is preferable.

OPERATION

The trays 2 are placed in the chicken house in the same manner as the plastic and cardboard trays of the prior art. However, the feeder trays 2 are designed to disintegrate beginning at about the eleventh day of use and will be completely disintegrated by the end of the 4 to 8 week growing cycle of the baby chicks. Consequently, the trays 2 do not have to be taken from the chicken house and disposed of after the baby chicks have outgrown them. The long hours of washing and sanitizing and folding are avoided and the risk associated with the common practice of burning is also avoided. Accordingly, the chicken grower is allowed to direct his resources toward more productive uses.

After the trays 2 have disintegrated into tiny particles, new trays are placed for the next batch of baby chicks. Since the trays 2 are inexpensive, it is feasible to use clean, sanitary trays each time, thereby preventing the spread of disease to the baby chicks.

Baby chicks are nervous creatures and continuously peck out of boredom and natural instinct. Baby chicks also stay very close to the chicken house heating stove 4 because that area is warm and the chicks mistake the heating stove 4 for their mother. Thus, even after the feed is no longer present in the feeder trays 2, the baby chicks continue to peck at the trays 2. This action disintegrates the tray 2 into tiny particles thereby to hasten the decomposition of the trays 2.

As an example, the feeder trays 2 were made from the same material as egg cartons with a thickness of approximately 1/16". The feeder trays 2 are then placed in the chicken house and filled with feed on the first day. After approximately eleven days, the feed is gone from the trays 2 and no more feed is added. After twelve to thirteen days, the disintegration of the feeder trays 2 begins. Approximately three weeks after the first day, the feeder trays 2 are approximately 50% to 70% disintegrated. Finally, after four weeks from the first day, the trays 2 are completely disintegrated.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

I claim:
1. A method for feeding baby chicks, comprising the steps of:
 (a) providing a peck-disintegratable, decompositionable and bio-degradable fiber material receptacle having a volume sufficient to hold a supply of feed for approximately 10-12 days for baby chicks in a brooder area, said receptacle comprising a material being adapted to start to disintegrate in approximately 12-13 days and to completely disintegrate in approximately 4 weeks from start of use of the receptacle;
(b) providing sufficient feed into the receptacle to last approximately 10-12 days;
(c) leaving the receptacle in place after the feed has been consumed;
(d) allowing the chicks to peck at the receptacle for approximately 4 weeks from the filling of the receptacle, whereby the tray is substantially disintegrated; and
(e) permitting the disintegrated receptacle to decompose on-site.

2. A method for feeding baby chicks, as in claim 1, and further comprising the step of:
(a) positioning the receptacle adjacent a heat source thereby attracting the baby chicks to the receptacle.

3. A method for feeding baby chicks, as in claim 1, and further comprising the step of:
(a) coloring the receptacle with a red dye.

* * * * *